(12) United States Patent
McCarra

(10) Patent No.: US 12,486,916 B2
(45) Date of Patent: Dec. 2, 2025

(54) FLAPPER CHECK VALVE ASSEMBLY

(71) Applicant: SCV Valve, LLC, Santa Fe, TX (US)

(72) Inventor: Sidney McCarra, League City, TX (US)

(73) Assignee: SCV Valve, LLC, Santa Fe, NM (US)

( * ) Notice: Subject to any disclaimer, the term of this patent is extended or adjusted under 35 U.S.C. 154(b) by 1 day.

(21) Appl. No.: 18/585,476

(22) Filed: Feb. 23, 2024

(65) Prior Publication Data
US 2025/0271069 A1    Aug. 28, 2025

(51) Int. Cl.
*F16K 15/03*    (2006.01)

(52) U.S. Cl.
CPC .................................... *F16K 15/03* (2013.01)

(58) Field of Classification Search
CPC ....................................................... F16K 15/03
See application file for complete search history.

(56) References Cited

U.S. PATENT DOCUMENTS 2,587,358 A * 2/1952 Mcrae ..................... F16K 15/03
                                                                137/463
11,268,627 B1 * 3/2022 Sarno .................. F16K 31/0655

OTHER PUBLICATIONS

Full Port Swing Check Valves—API 6D, SCV Valve Innovative Valve Solutions®, Santa Fe, TX, https://www.scvvalve.com/uploads/5/5/7/2/5572344/scv_fullport_scheck_010318_ebrochure.pdf.

* cited by examiner

*Primary Examiner* — P. Macade Nichols
(74) *Attorney, Agent, or Firm* — Bookoff McAndrews, PLLC

(57) ABSTRACT

A swing check valve includes a body and a swing assembly, the body including an inner volume having a middle portion extending between an upstream end portion and a downstream end portion and a wall that surrounds the inner volume and the swing assembly including a disc having an upstream surface that faces the upstream end portion when the disc is in a closed position and a downstream surface that faces the downstream end portion when the disc is in the closed position and a valve seat having an outer circumferential surface in contact with the wall. The body also includes a flow path extending from the upstream end portion to the downstream end portion, wherein the middle portion includes the flow path and an upper recess positioned above the flow path.

20 Claims, 5 Drawing Sheets

FLAPPER CHECK VALVE ASSEMBLY

TECHNICAL FIELD

Aspects of the present disclosure relate generally to valves and valve systems useful, for example, for fluid handling. In particular, aspects of the present disclosure relate to methods and systems for flapper check valves.

BACKGROUND

Valve devices, such as flapper check valve assemblies, are useful for fluid handling in, for example, the oil and gas, power, chemical, water works, waste water, and manufacturing industries. Flapper check valves are robust systems that are operable to prevent backflow in fluid handling systems, including those operated in harsh environments and under severe conditions. In order to perform in these environments, valve systems include components that are resistant to debris, corrosion, and wear.

Despite this robust construction, while the valve is in service, components of the valve assembly require regular inspections and maintenance. Even when inspections and maintenance are performed regularly, wear accumulates due to the operation of moving parts of the valve, affecting locations that cannot be accessed without disconnecting the valve from adjacent fluid handling components. For example, a pipeline inspection device, which can be referred to as a "pig," can cause damage or wear to critical components of the check valve, including the seat. In order to service or replace these components, it can be necessary to disconnect the valve from upstream and downstream components. However, removing the valve from a line is a time consuming process that introduces significant expense.

Flapper check valves are sometimes designed for use with an external component to help the valve function. For example, to provide a level of protection for the flapper during pigging, a check valve may include an external lock lever. Alternatively, a flapper check valve may be equipped with a slam dampener to help reduce the water hammer effect. While useful, these external components are typically integrated with the flapper check valve and thus are not designed to be changed.

SUMMARY

In one aspect, a swing check valve may include a body, the body including an inner volume having a middle portion extending between an upstream end portion and a downstream end portion and a wall that surrounds the inner volume. The body may also include a flow path extending from the upstream end portion to the downstream end portion, wherein the middle portion includes the flow path and an upper recess positioned above the flow path and a swing assembly including a disc including an upstream surface that faces the upstream end portion when the disc is in a closed position and a downstream surface that faces the downstream end portion when the disc is in the closed position and a valve seat having an outer circumferential surface in contact with the wall.

In another aspect, a valve system includes a body, the body including an inner volume having a middle portion extending between an upstream end portion and a downstream end portion, a wall that surrounds the inner volume, and a flow path extending from the upstream end portion to the downstream end portion, wherein the middle portion includes the flow path and an upper recess positioned above the flow path. The body may also include a key assembly positioned on an exterior surface of the wall, the key assembly including a hollow hub with a body and a keyway, wherein the keyway is a cutout on an inner surface of the hollow hub and a shaft with a body and a keyseat, wherein the keyseat is a cutout on an outer surface of the shaft, the hollow hub and the shaft being concentric.

In yet another aspect, a method of assembling a swing check valve system may include forming a body including an inner volume having a middle portion extending between an upstream end portion and a downstream end portion, a wall that surrounds the inner volume and a flow path extending from the upstream end portion to the downstream end portion, and a valve seat having an outer circumferential surface in contact with the wall, wherein the middle portion includes the flow path and an upper recess positioned above the flow path. The method may further include placing a swing assembly within the body including a disc including an upstream surface that faces the upstream end portion when the disc is in a closed position and a downstream surface that faces the downstream end portion when the disc is in the closed position and the upstream surface including a protrusion that protrudes towards the upstream end portion when the disc is in the closed position such that the protrusion extends furthest at a radial center portion of the disc, and wherein the protrusion protrudes past a downstream end of the valve seat in an upstream direction.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
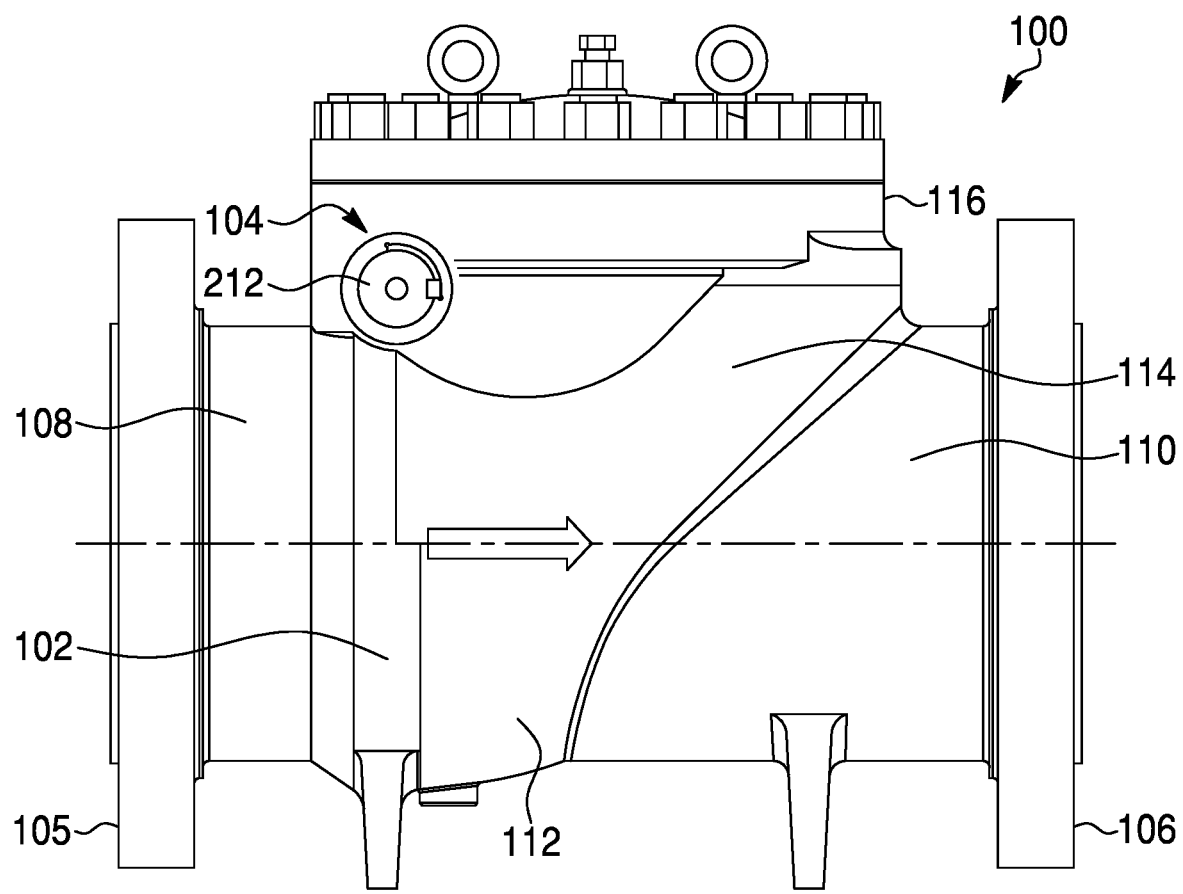
FIG. 1 is a side view of a flapper check valve assembly according to aspects of the present disclosure.

FIG. 1 is a side view of a flapper check valve assembly 100 according to aspects of the present disclosure. Flapper check valve assembly 100, also referred to herein as flapper check valve system 100, may include a body 102, a key assembly 104, and a swing assembly or flapper assembly 206 (shown in FIGS. 2A-2B).

Body 102 may include a pair of opposed ends formed by annular flanges or ports, including an upstream port 105 and a downstream port 106, ports 105 and 106 being part of an upstream end portion 108 and a downstream end portion 110, respectively. Body 102 may include a middle portion 114 with a bonnet 116. Body 102 is formed of a corrosion-resistant material, such as a metal material. Body 102 may be formed of carbon steel, for example.

Ports 105 and 106 may be sized and shaped for connection to upstream and downstream components, and may include a series of bolt holes (not shown) to allow ports 105 and 106 to facilitate leak-free connections to these components.

Figure 2A:
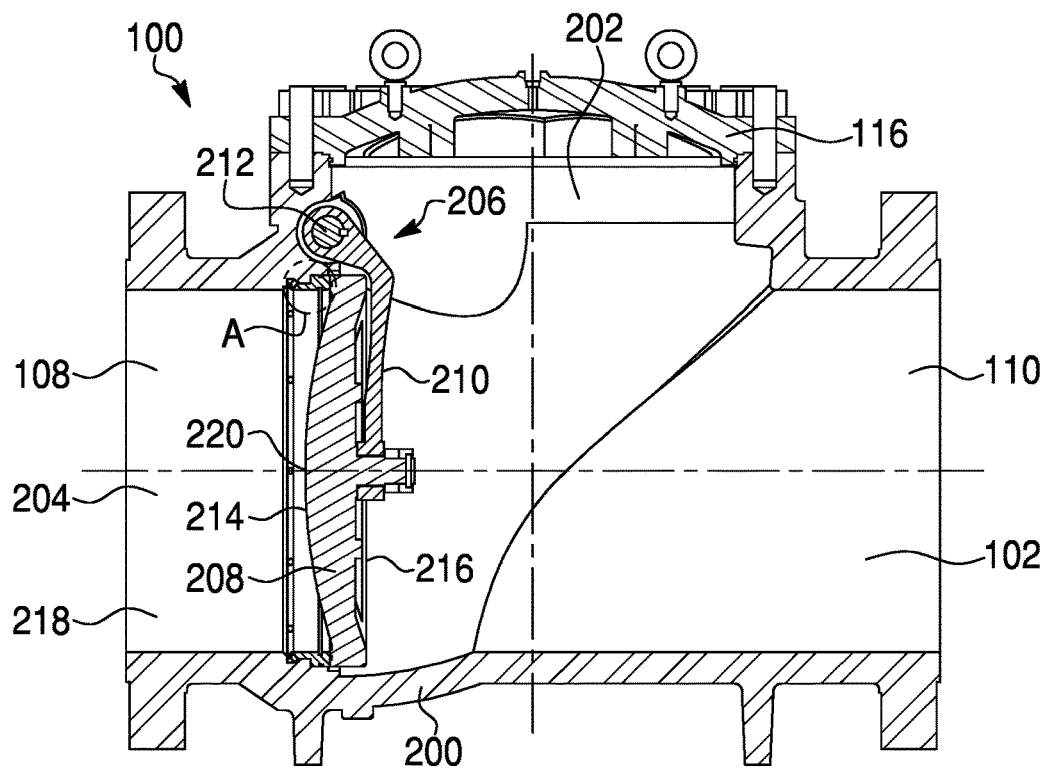
FIG. 2A is a cross-sectional view of the flapper check valve system in a closed position, according to aspects of the present disclosure.
Figure 2B:
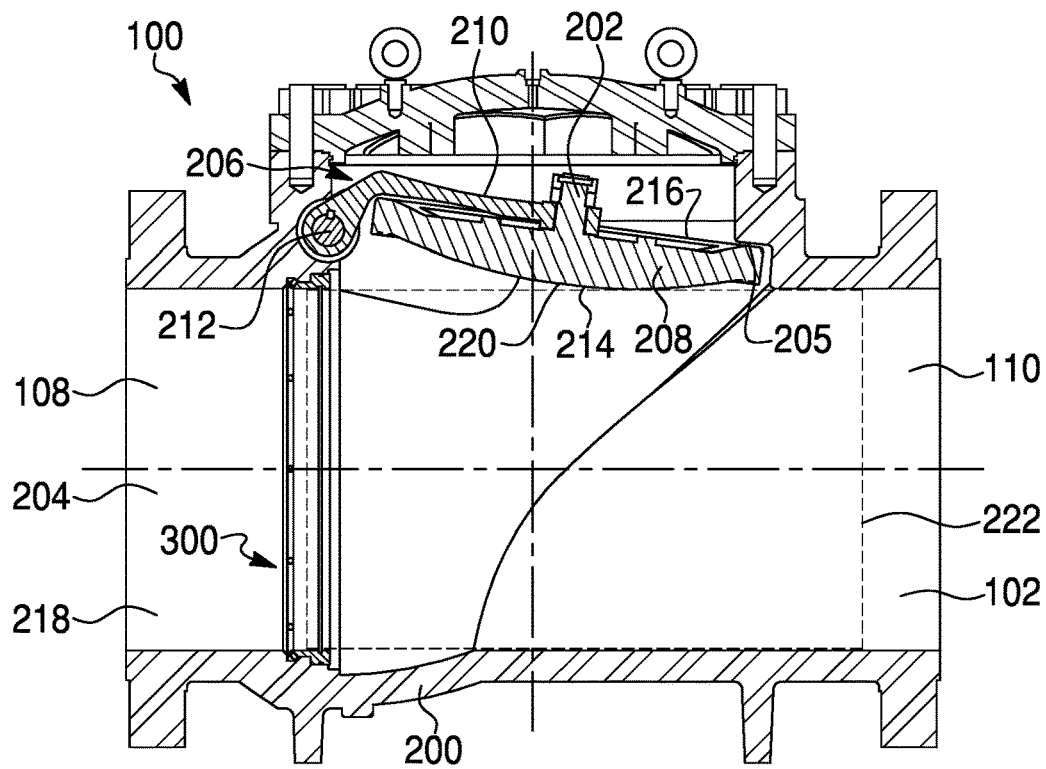
FIG. 2B is a cross-sectional view of the flapper check valve system in an open position, according to aspects of the present disclosure.

FIGS. 2A-2B are cross-sectional views of flapper valve assembly 100 of FIG. 1, with FIG. 2A showing a closed position of flapper assembly 206 and FIG. 2B showing an open position of flapper assembly 206. With reference to FIGS. 2A-2B, an inner volume 218 of body 102 may house swing assembly 206. Key assembly 104 (FIG. 1) may be positioned through an exterior surface 112 and through the wall 200 of body 102.

Inner volume 218 of body 102 is surrounded by wall 200, with an open portion of body 102 being closed with a bonnet 116. Inner volume 218 may include a flow path 204 with a diameter which flows through the flapper check valve assembly 100 from upstream end portion 108 to downstream end portion 110. Inner volume 218 at middle portion 114 may further include an upper recess 202 positioned above flow path 204 and below bonnet 116.

A swing assembly 206 may form a one-way valve that permits flow of fluid in a flow direction from upstream end portion 108 toward downstream end portion 110, and prohibits flow of fluid in a direction from downstream end portion 110 toward upstream end portion 108. Swing assembly 206 may include a disc 208, an arm 210, and a shaft 212. Flapper assembly 206 may further contact a removable valve seat 300. Swing assembly 206 may be moveable between a closed position in which disc 208 rests on removable valve seat 300, as shown in FIG. 2A, and an open position in which disc 208 is spaced away from and does not contact removable valve seat 300, as shown in FIG. 2B.

Disc 208 may have a diameter that is larger than the diameter of flow path 204 adjacent to upstream end portion 110. Disc 208 may be shaped to block the entirety of flow path 204 when in a closed position, fluidly separating upstream end portion 108 from downstream end portion 110. Disc 208 may include an upstream surface 214 that faces upstream end portion 108 when flapper assembly 206 is in the closed position and a downstream surface 216 that faces downstream end portion 110 when flapper assembly 206 is in the closed position. Disc 208 may be flat or may include protrusions that create a curved surface.

In some embodiments, upstream surface 214 may be flat or curved and include one or more bumps protruding towards upstream end portion 108. In other embodiments, upstream surface 214 is entirely smooth. In some aspects, disc 208 may be circular because flapper check valve assembly 100 has a circular flow path. As shown, disc 208 may be substantially dome-shaped. For example, upstream surface 214 may protrude towards upstream end portion 108 in such a way that upstream surface 214 extends furthest at a radial mid-portion, or in particular, the radial midpoint, of disc 208, which forms a contact point 220 for engaging a pig 222 (represented by a dashed-line box in FIG. 2B) within flow path 204 during pigging. "Pigging" as used herein refers to a method of cleaning pipelines in which a device sized to the diameter of the flow path of the pipeline (known as a pig) is inserted into the pipeline and moves from the upstream end to the downstream end and cleans and/or inspects the interior of the pipeline as it progresses.

In some embodiments, a center portion of upstream surface 214, and therefore the portion of upstream surface 214 that protrudes the furthest towards upstream end portion 108, contact point 220, extends past a downstream end of valve seat 300. In particular, upstream surface 214 may extend beyond a midpoint of removable valve seat 300, as measured in an axial direction defined by valve seat 300 and as shown in FIG. 2A. If desired, upstream surface 214 may extend beyond an upstream end of valve seat 300, protruding farther upstream than valve seat 300, as measured axially. Upstream surface 214 may be entirely curved or may have flat ends near where upstream surface 214 contacts removable valve seat 300, as shown in FIG. 2A. For example, upstream surface 214 may include an outer circumference configured to sealingly contact a downstream axial end of removable valve seat 300. The outer periphery of upstream surface 214 may include a tapered surface or chamfer for contacting removable valve seat 300.

Arm 210 may connect to downstream surface 216 of disc 208 in any suitable manner. For example, arm 210 may be connected by a pin or other fastener to allow disc 208 and arm 210 to be disengaged from one another. Arm 210 may additionally couple to shaft 212 so that shaft 212 rotates with arm 210 and moves with disc 208. Arm 210 may be coupled to shaft 212 so there is no independent rotational movement between arm 210 and shaft 212.

Shaft 212 may be positioned in upper recess 202. As shown in FIG. 2A, shaft 212 may extend through inner volume 218 in a direction perpendicular to flow path 204 and into and/or through two portions of wall 200. For example, in FIGS. 2A-2B, flow path 204 extends from left to right while shaft 212 extends into and out of the sheet. Shaft 212 may have an exterior portion outside of body 102 and an interior portion. In some embodiments, shaft 212 may only be within body 102 (e.g., an entirety of shaft 212 is located between front and rear sides of body 102 that are located orthogonal to upstream and downstream end portions 108 and 110). The interior portion of shaft 212 may extend through key assembly 104, through upper recess 202 (in a perpendicular direction to flow path 204 as described above), and into wall 200. Shaft 212 may be supported by one or more bearings to reduce friction when shaft 212 is rotating.

In the exemplary embodiment shown in FIG. 2B, shaft 212 is positioned such that disc 208 and arm 210 may abut wall 200 when in the open position. In some embodiments, wall 200 may include a wall portion 205 that contacts swing assembly 206 in the open position. Additionally, a stopper (not shown) may protrude from the wall portion 205 instead to contact swing assembly 206 in the open position instead. In other embodiments, swing assembly 206 may have enough clearance to swing open and not contact wall 200.

When sufficient force presses against upstream surface 214 (e.g., a sufficient flow in a downstream direction), the flow from upstream end portion 108 to downstream end portion 110 causes the swing assembly 206 to automatically swing into the open position. For example, when fluid (e.g., oil, other petroleum products, water, etc.) introduced from upstream end portion 108 applies sufficient force on upstream surface 214, disc 208 may swing (upwards and towards the downstream end portion 110 in FIG. 2A) so as to allow fluid communication in a direction from upstream end portion 108 toward downstream end portion 110. Conversely, swing assembly 206 protects the system from backflow as gravity and force against downstream surface 216 automatically pivots swing assembly 206 into the closed position. In other words, swing assembly 206 may automatically move into the closed position and block reverse or upstream flow of fluid in a direction from downstream end portion 110 toward upstream end portion 108. Shaft 212 may act as a pivot point for swing assembly 206. Bearings may be located at each end of shaft 212, thus allowing shaft 212 to rotate when disc 208 rotates.

In some embodiments, shaft 212 may terminate within wall 200 on one side while extending through wall 200 on the other side, allowing for external components to connect to shaft 212 and interact with swing assembly 206. Arm 210 may act as a pivot arm by coupling disc 208 to shaft 212. Because the upstream surface 214 may be substantially dome shaped, during pigging, pig 222 contacts disc 208 at contact point 220 prior to contacting any part of swing assembly 206, and prior to contacting any part of removable valve seat 300. Advantageously, the shape of disc 208 protects removable valve seat 300 from wear or damage during pigging. During pigging, pig 222 may "ride" along upstream surface 214 while pig 222 is passing through valve assembly 100. This may further protects the disc 208 (and other parts of assembly 100) from damage during the pigging process.

Removable valve seat 300 may be a ring-shaped member inserted within a recess of body 102. Removable valve seat 300 may be formed of a corrosion and wear-resistant material that is suitable for repeated contact with the angled or chamfered surface of disc 208. Removable valve seat 300 may also include an inclined or chamfered surface. Removable valve seat 300 may be formed of a metal material, such as a material including carbon steel. In some aspects, removable valve seat 300 may include a polymeric material, such as polytetrafluoroethylene (PTFE), polyether ether ketone (PEEK), other polymers, and composites thereof. As mentioned above, removable valve seat 300 may be coaxially disposed with respect to disc 208 when disc 208 is in the closed position to contact an outer circumference of upstream surface 214 such that a portion of upstream surface 214 protrudes at least partially through an inner diameter of removable valve seat 300.

Figure 3:
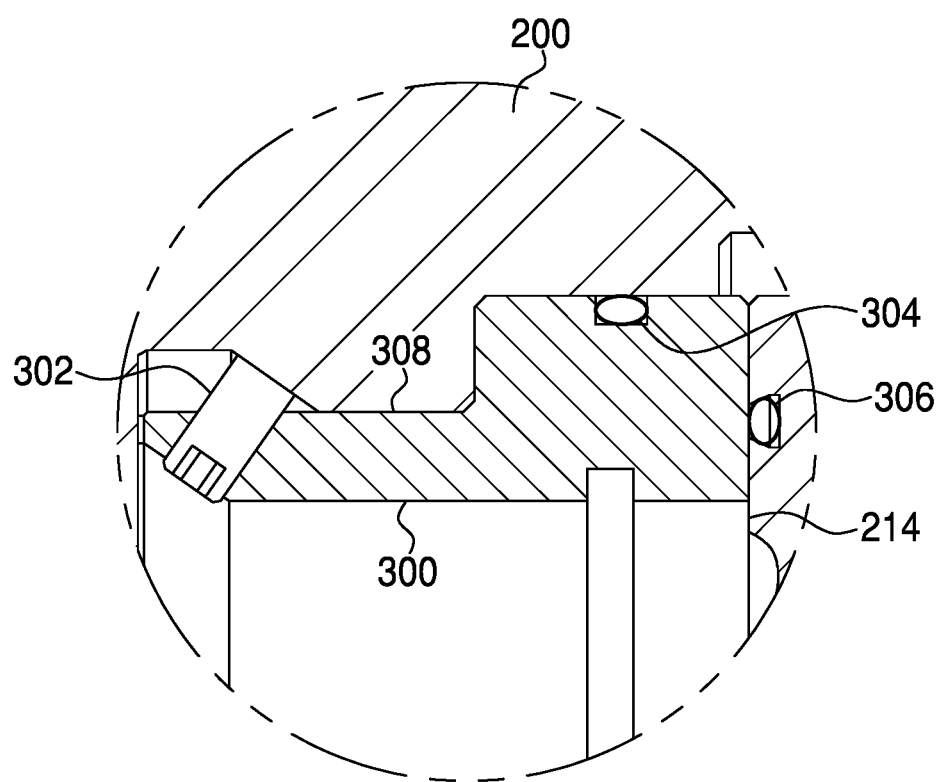
FIG. 3 is an enlarged view of Detail A of FIG. 2A.

In FIG. 3, removable valve seat 300 may be secured to wall 200 by a set screw 302. While one set screw 302 is shown in FIG. 3, there may be more than one set screw 302 used to fasten valve seat 300. Seals 304 and 306 (e.g., O-rings) may provide additional sealing for removable valve seat 300. Set screw 302 allows removable valve seat 300 to be removed and replaced when needed, therefore extending the life of flapper check valve assembly 100. Removable valve seat 300 may be firmly secured to body 102 without the need to be permanently attached to body 102 (e.g., by welding or by being cast or otherwise formed with body 102). The assembly of removable valve seat 300 may aid in reducing or eliminating vibration and extend the life of flapper check valve assembly 100 by reducing wear on swing assembly 206 and removable valve seat 300.

Removable valve seat 300 may include an outer circumferential surface 308 that is in contact with wall 200. Outer circumferential surface 308 may face wall 200 so as to be free of welding, or other mechanisms for permanently fixing removable valve seat 300 to wall 200. In some aspects, removable valve seat 300 may be fixed by the force applied by swing assembly 206. Thus, removable valve seat 300 may be secured so as to abut wall 200 in a manner that allows removal of removable valve seat 300 without the need to use cutting tools to separate removable valve seat 300 from wall 200.

Figure 4A:
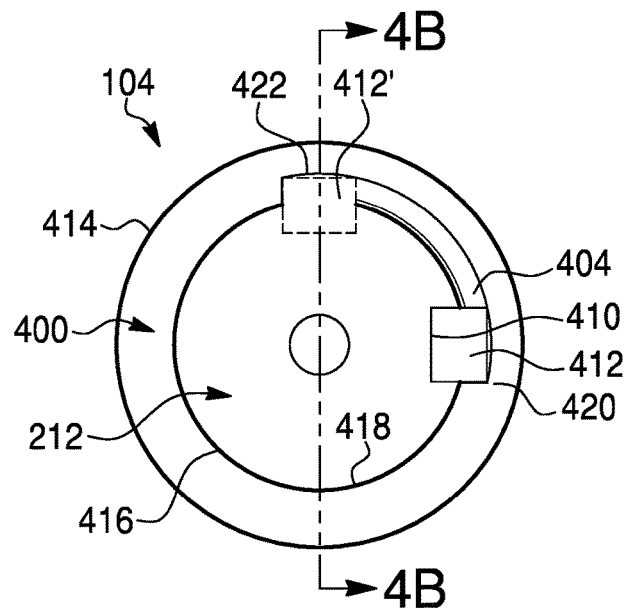
FIG. 4A is a front view of the key assembly, according to aspects of the present disclosure.
Figure 4B:
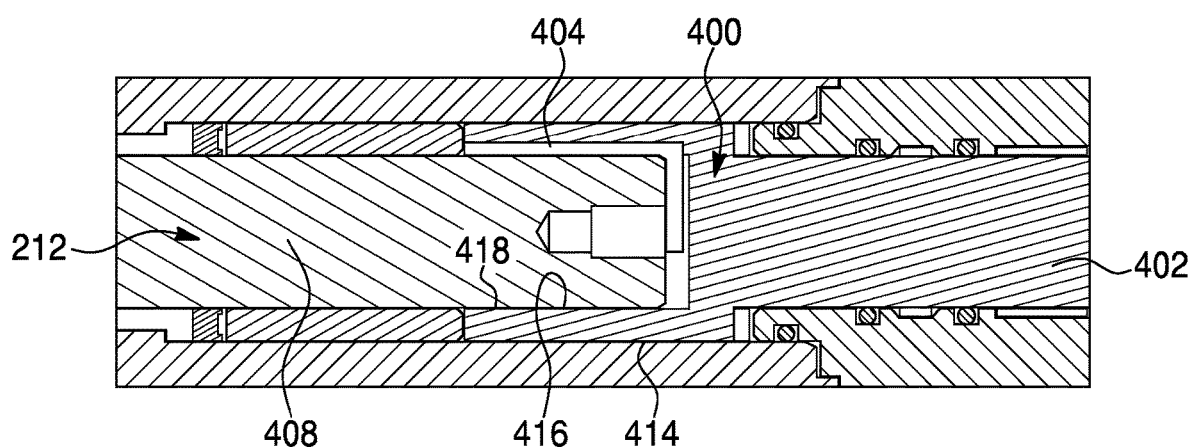
FIG. 4B is a cross-sectional side view of the key assembly, according to aspects of the present disclosure.

Key assembly 104, formed on exterior surface 112 of flapper check valve assembly 100 in FIG. 1, may be used to connect different accessory devices to flapper check valve assembly 100. As shown in FIG. 4A and FIG. 4B, key assembly 104 may include a hollow hub 400 with a body 402 and a keyway 404, a shaft 212 with a body 408 and a keyseat 410, and a key 412. Hollow hub 400 may also have an outer surface 414 and an inner surface 416 while shaft 212 has an outer surface 418. Hollow hub 400 and shaft 212 may be concentric so that hollow hub 400 surrounds at least a portion of shaft 212. For example, shaft 212 may fit within hollow hub 400 such that inner surface 416 and outer surface 418 are in contact with one another.

Keyway 404 may be a cutout on inner surface 416 extending (e.g., in an arc) along at least a portion of body 402. Keyseat 410 may be a cutout on outer surface 418 extending along at least a portion of body 408. Key 412 may be a metal piece shaped to fit within keyseat 410 and to move within keyway 404 when keyseat 410 and keyway 404 are overlapped. Key 412 may take different shapes; for example, key 412 may be substantially half-moon shape with a flat, straight side and a curved side, or key 412 may be substantially rectangular with all straight sides. Since the bottom portion of key 412 sits in keyseat 410 and the top portion of key 412 fits in keyway 404, keyseat 410 may resemble the bottom half of key 412 while keyway 404 may resemble the top half of key 412. Thus, keyseat 410 and keyway 404 resemble the shape of key 412 when overlapped.

Inserting key 412 into keyseat 410 and keyway 404 of key assembly 104 prevents the independent motion of hollow hub 400 and shaft 212 and ensures both rotate together. When key 412 is engaged, hollow hub 400 may be blocked from rotation around shaft 212 and, instead, is permitted to rotate with shaft 212. As can be seen in FIG. 4A, the geometric constraints of key assembly 104 restricts the manual movement of hollow hub 400 and shaft 212 when key 412 is engaged.

Key assembly 104 may be limited to 90 degrees of rotation. For example, key assembly 104 may be at rest at a first position 420 and can be rotated 90 degrees counterclockwise to a second position 422. In FIG. 4A first position 420 of key 412 is represented with solid lines, with a second position 422 being represented by dashed lines. Key assembly 104 may be similarly capable of being rotated 90 degrees clockwise from second position 422 to first position 420.

In aspects of the present disclosure, hollow hub 400 may be formed by a portion of an external component (e.g., a lock lever 500, a lock gear 502, or a slam dampener 504, shown in FIGS. 5A-5C, respectively, and described below). Hollow hub 400 may be configured to interact with swing assembly 206 via shaft 212. When hollow hub 400 is a portion of an external component, hollow hub 400 is positioned on the exterior portion of shaft 212. As described above, when key 412 is not engaged hollow hub 400 can move independently of shaft 212. This may allow for easy interchangeability as the external component can be swapped when key 412 is not engaged. When key 412 is engaged, however, movements of the external component can cause shaft 212 to rotate and affect the position of disc 208. While three exemplary components are described herein, external components that are configured to interact with swing assembly 206 are within the scope of this disclosure.

Figure 5A:
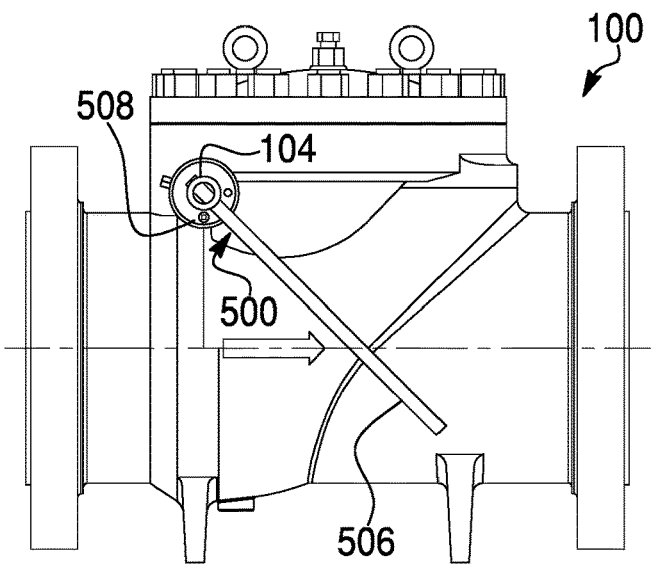
FIG. 5A is a side view of a valve system with a lock lever, according to aspects of the present disclosure.
Figure 5B:
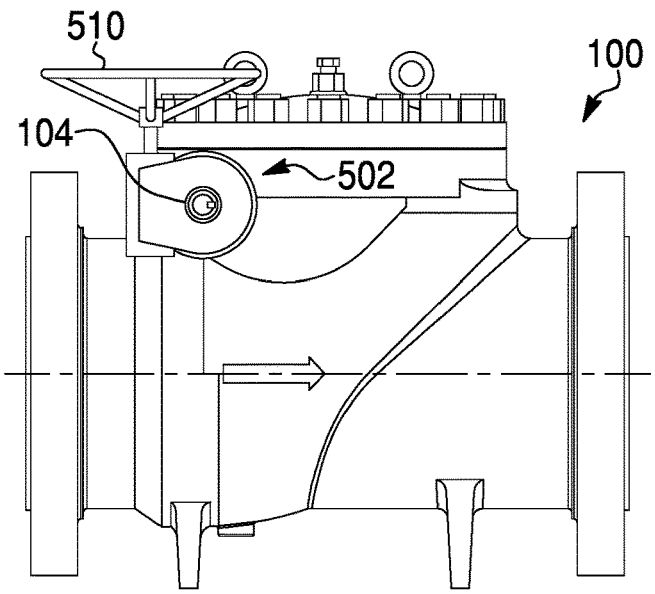
FIG. 5B is a side view of a valve system with a lock gear, according to aspects of the present disclosure.
Figure 5C:
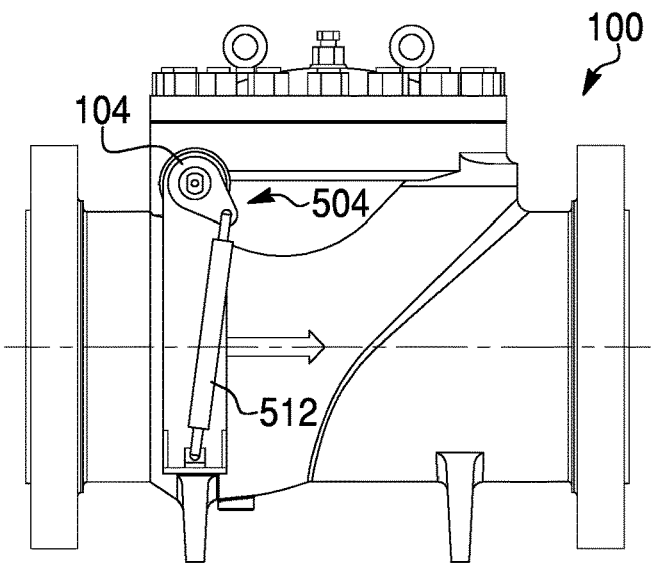
FIG. 5C is a side view of a valve system with a slam dampener, according to aspects of the present disclosure.

Key assembly 104 allows for numerous parts to interact with swing assembly 206 in an interchangeable manner, including lock lever 500, lock gear 502, and slam dampener 504, shown in FIGS. 5A-5C respectively. Each of lock lever 500, lock gear 502, and slam dampener 504 may act as an extension to shaft 212 by connecting and securing to key assembly 104.

As shown in FIG. 5A, lock lever 500 may include a lever 506 that can move between a first position and a second position. When key 412 is inserted within key assembly 104, swing assembly 206 may rotate with lock lever 500 and allows lock lever 500 to control the position of swing assembly 206. Lock lever 500 may operatively control swing assembly 206 to be in a closed position in which disc 208 rests upon removable valve seat 300 and closes flow path 204 when key 412 is in first position 420 and to be in an open position in which disc 208 is spaced away from removable valve seat 300 and opens flow path 204 when key 412 is in second position 422. Lock lever 500 may additionally include a lock pin 508 to manually lock the lock lever 500 in second position 422 which may be desired for pigging and/or inspection.

Lock gear 502 may include a gear 510 that can twist between a first position and a second position. Because lock gear 502 may be connected to shaft 212, when key 412 is inserted swing assembly 206 rotates with lock gear 502 and allows lock gear 502 to control the position of swing assembly 206. Lock gear 502 may operatively control swing assembly 206 to be in a closed position in which disc 208 rests upon removable valve seat 300 and closes flow path 204 when key 412 is in first position 420 and to be in an open position in which disc 208 is spaced away from removable valve seat 300 and opens flow path 204 when key 412 is in second position 422. Similarly to lock lever 500, lock gear 502 allows manual opening of flow path 204 which may be desired for pigging and/or inspection.

Slam dampener 504 may include a hydraulic assembly 512 with an adjustable governor to regulate the speed at which disc 208 closes. In general, slam dampener 504 may be configured to decelerate disc 208 during closing to prevent slamming against removable valve seat 300. Slowing the close speed of swing assembly 206 may help reduce a water hammer effect, thus minimizing sudden upstream pressure to avoid damage to removable valve seat 300, disc 208, wall 200, and other internal components of flapper check valve assembly 100.

It will be apparent to those skilled in the art that modifications may be made in the disclosed systems and methods without departing from the scope of the disclosure. Other aspects of the disclosure will be apparent to those skilled in the art from consideration of the specification and practice of the features disclosed herein. It is intended that the specification and embodiments be considered as exemplary only.

What is claimed is:

1. A swing check valve, comprising:
a body including:
an inner volume having a middle portion extending between an upstream end portion and a downstream end portion;
a wall that surrounds the inner volume; and
a flow path extending from the upstream end portion to the downstream end portion, wherein the middle portion includes the flow path and an upper recess positioned above the flow path;
a valve seat having an outer circumferential surface in contact with the wall; and
a swing assembly including a disc having an upstream surface that faces the upstream end portion when the disc is in a closed position and a downstream surface that faces the downstream end portion when the disc is in the closed position;
wherein the upstream surface of the disc includes a protrusion that protrudes towards the upstream end portion of the inner volume when the disc is in the closed position such that the protrusion extends furthest in an upstream direction at a radial center portion of the disc, and wherein the protrusion protrudes past a downstream end of the valve seat in the upstream direction.

2. The swing check valve of claim 1, wherein the valve seat is removable.

3. The swing check valve of claim 1, further comprising a stopper that contacts the downstream surface when the disc is in an open position.

4. The swing check valve of claim 1, wherein the valve seat has an inclined or chamfered sealing surface.

5. A valve system, comprising:
a body including:
an inner volume having a middle portion extending between an upstream end portion and a downstream end portion;
a wall that surrounds the inner volume; and
a flow path extending from the upstream end portion to the downstream end portion, wherein the middle portion includes the flow path and an upper recess positioned above the flow path; and
a key assembly positioned on an exterior surface of the wall, the key assembly including:
a hollow hub with a body and a keyway, wherein the keyway is a cutout on an inner surface of the hollow hub; and
a shaft with a body and a keyseat, wherein the keyseat is a cutout on an outer surface of the shaft, wherein the hollow hub and the shaft are concentric.

6. The valve system of claim 5, the key assembly further including a key configured to fit within the keyseat and to extend past the outer surface of the shaft in a radial direction.

7. The valve system of claim 5, wherein at least a portion of the keyseat of the shaft is circumferentially surrounded by the inner surface of the hollow hub.

8. The valve system of claim 5, wherein the hollow hub is configured to receive a key that connects the hollow hub with the shaft by contacting the keyway and the keyseat such that the key prevents rotation of the hollow hub relative to the shaft.

9. The valve system of claim 5, further comprising:
a valve seat having an outer circumferential surface in contact with the wall;
the shaft with an exterior portion outside of the body of the valve system and an interior portion, the interior portion extending through the key assembly, through the upper recess in a direction perpendicular to the flow path, and into the wall; and
a swing assembly including:
a disc having an upstream surface that faces the upstream end portion when the disc is in a closed position and a downstream surface that faces the downstream end portion when the disc is in the closed position; and an arm connected to the shaft and to the downstream surface such that the arm allows the disc to rotate with the shaft;

wherein the hollow hub is positioned on the exterior portion of the shaft, wherein the upstream surface of the disc includes a protrusion that protrudes towards the upstream end portion when the disc is in the closed position such that the protrusion extends furthest at a radial center portion of the disc, and wherein the protrusion protrudes past a downstream end of the valve seat in an upstream direction.

10. The valve system of claim 9, wherein the hollow hub is a portion of a lock lever, the lock lever including a lever that can move between a first position and a second position, wherein the lock lever operatively controls the swing assembly to be in a closed position in which the disc rests upon the valve seat and closes the flow path when in the first position, and wherein the lock lever operatively controls the swing assembly to be in an open position in which the disc is spaced away from the valve seat and opens the flow path when in the second position.

11. The valve system of claim 10, the lock lever further including a lock pin to manually lock the lock lever in the second position.

12. The valve system of claim 10, wherein the lock lever moves from the first position to the second position by the key assembly being rotated, via the lock lever, 90 degrees.

13. The valve system of claim 9, wherein the hollow hub is a portion of a lock gear, the lock gear configured to move between a first position and a second position, wherein the lock gear operatively controls the swing assembly to be in a closed position in which the disc rests upon the valve seat and closes the flow path when in the first position, and wherein the lock gear operatively controls the swing assembly to be in an open position in which the disc is spaced away from the valve seat and opens the flow path when in the second position.

14. The valve system of claim 13, wherein the lock gear moves from the first position to the second position by the key assembly being rotated, via the lock gear, 90 degrees counterclockwise about an arcuate path, and wherein the lock gear moves from the second position to the first position by rotating 90 degrees clockwise about the arcuate path.

15. The valve system of claim 9, wherein the hollow hub is a portion of a slam dampener, the slam dampener including a hydraulic assembly, and wherein the slam dampener is configured to decelerate the disc during closing.

16. The valve system of claim 15, the slam dampener further including an adjustable governor configured to regulate the speed at which the disc decelerates.

17. A method of assembling a swing check valve system, the method comprising:

forming a body including:
an inner volume having a middle portion extending between an upstream end portion and a downstream end portion;
a wall that surrounds the inner volume; and
a flow path extending from the upstream end portion to the downstream end portion, wherein the middle portion includes the flow path and an upper recess positioned above the flow path;

placing a swing assembly within the body including a disc having an upstream surface that faces the upstream end portion when the disc is in a closed position and a downstream surface that faces the downstream end portion when the disc is in the closed position;

wherein the body houses a valve seat having an outer circumferential surface in contact with the wall, wherein the upstream surface includes a protrusion that protrudes towards the upstream end portion when the disc is in the closed position such that the protrusion extends furthest at a radial center portion of the disc, and wherein the protrusion protrudes past a downstream end of the valve seat in an upstream direction, and an upstream end of the valve seat extends past the protrusion in the upstream direction.

18. The method of claim 17, wherein the valve seat is removable.

19. The method of claim 17, further including providing a stopper that contacts the downstream surface when the swing assembly is in an open position.

20. The method of claim 17, wherein the valve seat has a sealing surface that is inclined or chamfered.

* * * * *